(12) United States Patent
Cunningham et al.

(10) Patent No.: US 9,280,736 B2
(45) Date of Patent: *Mar. 8, 2016

(54) METHOD AND APPARATUS FOR A RADIO FREQUENCY IDENTIFICATION REPEATER WHICH IS COUPLED TO A RADIO FREQUENCY IDENTIFICATION TAG

(71) Applicant: AT&T Intellectual Property II, L.P., Atlanta, GA (US)

(72) Inventors: Timothy Cunningham, Dedham, MA (US); Robert R. Miller, II, Convent Station, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/159,240

(22) Filed: Jan. 20, 2014

(65) Prior Publication Data

US 2014/0132395 A1      May 15, 2014

Related U.S. Application Data

(63) Continuation of application No. 12/818,375, filed on Jun. 18, 2010, now Pat. No. 8,633,822, which is a continuation of application No. 11/618,889, filed on Dec. 31, 2006, now Pat. No. 7,741,970.

(51) Int. Cl.
| | |
|---|---|
| *G08B 21/00* | (2006.01) |
| *G06K 17/00* | (2006.01) |
| *H04B 5/00* | (2006.01) |

(52) U.S. Cl.
CPC .......... *G06K 17/0022* (2013.01); *H04B 5/0062* (2013.01)

(58) Field of Classification Search
CPC .................................................. G06K 17/0022
USPC ............... 340/572.1, 572.8, 10.1, 572.7, 505, 340/425.1
See application file for complete search history.

(56) References Cited

U.S. PATENT DOCUMENTS

| | | | |
|---|---|---|---|
| 5,898,801 | A  | 4/1999  | Braun et al. |
| 6,271,815 | B1 | 8/2001  | Yang et al. |
| 6,995,673 | B1 | 2/2006  | Osredkar et al. |
| 7,088,229 | B2 | 8/2006  | Johnson |
| 7,295,108 | B2 | 11/2007 | Corrado et al. |
| 7,427,018 | B2 | 9/2008  | Berkun |
| 7,570,167 | B2 | 8/2009  | Fein et al. |

(Continued)

FOREIGN PATENT DOCUMENTS

| | | |
|---|---|---|
| JP | 2000-163524 | 6/2000 |
| JP | 2001-022905 | 1/2001 |

(Continued)

OTHER PUBLICATIONS

Examiner's Office Letter for JP Patent Application No. 2007-323222, Apr. 27, 2012, consists of 4 unnumbered pages.

*Primary Examiner* — Jeffery Hofsass

(57) ABSTRACT

The present method enables an RFID repeater to be used in conjunction with an RFID tag to allow data in the RFID tag to be read using wireless packet switched technologies. For example, the present method enables an RFID repeater to be coupled with an RFID tag. The RFID repeater reads and records the data from the RFID tag and then transmits the retrieved data from the RFID tag over a wireless packet network.

20 Claims, 3 Drawing Sheets

(56) References Cited

U.S. PATENT DOCUMENTS

| | | |
|---|---|---|
| 7,692,532 B2 | 4/2010 | Fischer et al. |
| 7,741,970 B2 | 6/2010 | Cunningham et al. |
| 7,750,810 B2 | 7/2010 | Ritter et al. |
| 8,238,828 B2 | 8/2012 | Chava |
| 8,633,822 B2 | 1/2014 | Cunningham |
| 2004/0175184 A1 | 9/2004 | Shikatani |
| 2005/0154872 A1 | 7/2005 | McGrew |
| 2005/0275531 A1 | 12/2005 | Johnson |
| 2007/0069851 A1 | 3/2007 | Sung et al. |
| 2007/0171073 A1 | 7/2007 | Ariyoshi et al. |
| 2008/0129457 A1 | 6/2008 | Ritter et al. |
| 2008/0150698 A1 | 6/2008 | Smith et al. |
| 2008/0204248 A1 | 8/2008 | Cam Winget et al. |
| 2008/0253202 A1 | 10/2008 | Yu et al. |
| 2008/0297311 A1 | 12/2008 | Wu |
| 2008/0309494 A1 | 12/2008 | Bahar |
| 2009/0136027 A1 | 5/2009 | Salowey et al. |
| 2009/0224045 A1 | 9/2009 | Toda et al. |
| 2009/0272799 A1 | 11/2009 | Skor et al. |
| 2010/0295878 A1 | 11/2010 | Mathea et al. |
| 2011/0049243 A1 | 3/2011 | Gong et al. |
| 2011/0116798 A1 | 5/2011 | Kai |
| 2011/0158653 A1 | 6/2011 | Mazed |
| 2012/0128367 A1 | 5/2012 | Yamada |

FOREIGN PATENT DOCUMENTS

| | | |
|---|---|---|
| JP | 2006-331069 | 12/2006 |
| JP | 2006-197202 | 7/2008 |

100

200

METHOD AND APPARATUS FOR A RADIO FREQUENCY IDENTIFICATION REPEATER WHICH IS COUPLED TO A RADIO FREQUENCY IDENTIFICATION TAG

This application is a continuation of U.S. patent application Ser. No. 12/818,375, filed Jun. 18, 2010, which is currently allowed and is a continuation of U.S. patent application Ser. No. 11/618,889, filed Dec. 31, 2006, now U.S. Pat. No. 7,741,970, all of which are incorporated herein by reference in their entirety.

The present invention relates generally to Radio Frequency Identification (RFID) and, more particularly, to a method and apparatus for an RFID repeater in a wireless packet switched network.

BACKGROUND OF THE INVENTION

In an existing RFID network, an RFID tag is read by an RFID reader via an RFID reader antenna. The RFID tag must be in close proximity to the RFID reader antenna to retrieve data from the RFID tag, particularly if the RFID tag is passive (does not have a self-contained battery). However, if the RFID tag physically moves around in a large area, the tracking of the RFID potentially requires that a large number of RFID antennas be deployed in all the areas that the RFID tag traverses. The specialized RFID infrastructure that needs to be deployed in a large scale can be very expensive. If an RFID tag can be read using other existing wireless technologies, such as Wi-Fi, UWB, Zigbee, or cellular, the cost of deploying specialized RFID infrastructure can be substantially minimized.

Therefore, a need exists for a method and apparatus for providing an RFID repeater in a wireless packet switched network.

SUMMARY OF THE INVENTION

In one embodiment, the present invention enables an RFID repeater to be used in conjunction with an RFID tag to allow data in the RFID tag to be read using wireless packet switched technologies. For example, the present method enables an RFID repeater to be coupled with an RFID tag. The RFID repeater reads and records the data from the RFID tag and then transmits the retrieved data from the RFID tag over a wireless packet network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
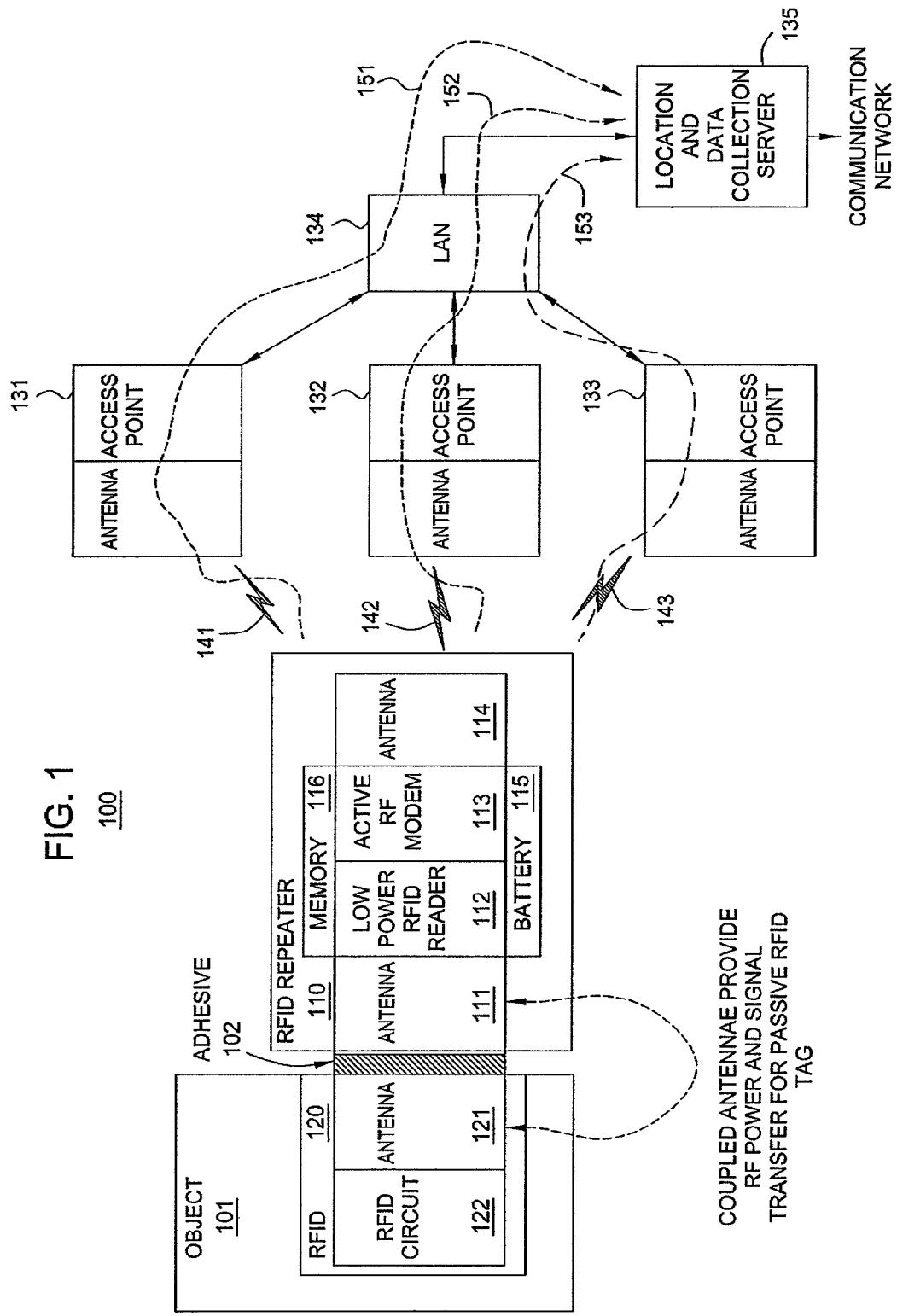
FIG. 1 illustrates an exemplary RFID repeater and associated wireless networks of the present invention.

As discussed above, if an RFID tag physically moves around in a large area, the tracking of the RFID potentially requires a large number of RFID antennas and readers to be deployed in all the areas that the RFID tag traverses. The specialized RFID infrastructure that needs to be deployed in a large scale can be very expensive. If an RFID tag can be read using other existing wireless technologies, such as an Ethernet-like wireless Local Area Network such as IEEE 802.11 (Wi-Fi), a Personal Area Network such as UWB or Zigbee, a Metropolitan Area Network such as IEEE 802.16 (WiMAX), or cellular Wide-Area Network, the cost of deploying specialized RFID infrastructure can be minimized.

To address this criticality, the present invention enables an RFID repeater to be used in conjunction with an RFID tag to allow data in the RFID tag to be read using existing wireless packet switched technologies. In one embodiment, the present invention enables an RFID repeater to be installed over an RFID tag using a standard fastening material such as hook-and-loop fasteners (also known by the tradename, "Velcro" of Velcro Industries of the Netherlands). The RFID repeater reads and records the data from the RFID tag and then transmits the retrieved data from the RFID tag over standard wireless packet network including, but not limited to, wireless Personal Area Network, Local Area Network, Metropolitan Area Network, and Wide-Area cellular network air interfaces.

It should be noted that Wi-Fi refers to the underlying technology of wireless local area networks (WLAN) based on the IEEE 802.11 standard. UWB refers to a technology for transmitting information spread over a large bandwidth, such as larger than 500 MHz, which enables spectrum sharing among multiple users. Zigbee refers to a specification for a suite of high level communication protocols using small, low power digital radios based on the IEEE 802.15.4 standard for wireless personal area networks (WPAN). WiMAX refers to networks based on the IEEE 802.16 Metropolitan Area Network standard. Cellular refers to a radio network made up of a number of radio cells where each radio cell is served by a cell site or base station.

In one embodiment, the RFID repeater comprises a short range reader as well as a radio frequency modem device, which can further be used to provide identification, location, light, temperature, humidity, audio, and biological data. Once it has read the RFID tag to which it is attached, the embedded reader in the RFID repeater records the RFID tag data to conserve power and to avoid collisions from other RFID tags. It usually does not have to read the tag again, but can be commanded remotely to do so to verify that the repeater is still attached to its associated RFID tag, for example. The physical architecture locks the RFID tag in close and readable proximity to the RFID repeater, thus associating both the RFID and repeater with a reference object, such as a package, an object, or a person to be tracked. The present invention creates an integrated platform to extend the availability of RFID tag data to be used for additional applications, such as real time asset tracking and work flow management via standard wireless technologies.

FIG. 1 illustrates an exemplary RFID repeater and the associated wireless networks of the present invention. In FIG. 1, RFID tag 120, comprising an antenna 121 and a RFID circuit 122, is attached to an object (or an individual) 101 that is to be tracked by location and data collection server 135. In one embodiment, RFID tag 120 and RFID repeater 110 are adhered to each other using an adhesive material 102. Thus, the RFID repeater 110 can be selectively attached or detached from the RFID tag 120. The ability of the RFID repeater to be selectively attached to an RFID tag allows a particular object or individual to be tracked. For example, there may be a need to more closely track an elderly person or a young child in a medical facility. As such, RFID tags 120 that are provided to the elderly person or a young child will further contain the RFID repeaters 110, whereas other patients in the medical facility will only have the RFID tags 120. Note that RFID tag 120 can be a passive or an active RFID tag.

In one embodiment, RFID repeater 110 comprises an antenna 111 (e.g., a first antenna), a low power RFID reader 112, an active RF modem 113, antenna 114 (e.g., a second antenna), a battery 115, and a memory 116. RFID repeater 110 is powered by the battery 115. If the RFID tag 120 is a passive tag, antenna 111 and antenna 121 are used to provide power and signal transfer between RFID tag 120 and RFID repeater 110. In particular, low power RFID reader 112 can use antenna 111 to send power (e.g., a signal) to RFID 120 via antenna 121 and retrieve the data embedded in RFID circuit 122 to be stored in the memory 116 of the RFID repeater 110. Once the data embedded in the RFID tag 120 has been read by the RFID reader 112, RFID 112 is deactivated to conserve the power of battery 115. The data retrieved from RFID tag 120 can then be communicated to location and data collection server 135 using active RF modem 113 via standard wireless packet protocols. For example, active RF modem 113 in RFID repeater 110 may use antenna 114 to communicate with access points 131, 132, and 133 via wireless links 141, 142, and 143 respectively.

For example, if the RFID repeater is in an area covered by access point 131, wireless link 141 is used to provide wireless access between RFID repeater 110 and access point 131. If the RFID repeater is in an area covered by access point 132, wireless link 142 is used to provide wireless access between RFID repeater 110 and access point 132. If the RFID repeater is in an area covered by access point 133, wireless link 143 is used to provide wireless access between RFID repeater 110 and access point 133. It is also possible that the RFID repeater may be heard by more than one access point, allowing location detection more precise than could be provided if only one access point can receive the signal. Those skilled in the art will recognize that several methods can be used to provide improved location determination using a plurality of access points to interact with the repeater.

Note further that, access points 131, 132, and 133 are connected to Local Area Network (LAN) 134 which in turn is connected to the location and data collection server 135. LAN 134 can employ wired or wireless LAN technologies. Data read from memory 116 residing in RFID repeater 110, via active RF modem 113 and antenna 114, is communicated to location and data collection server 135 using flows 151, 152, or 153 depending on the actual location of RFID repeater 110. The wireless packet access protocols used between RFID repeater 110 and the access points include, but are not limited to, UWB, Zigbee, Wi-Fi, and cellular protocols. In addition to providing data retrieved from RFID 120, RFID repeater 110 can provide additional data including, but not limited to, identification, location, light, temperature, humidity, audio, and biological data.

Figure 2:
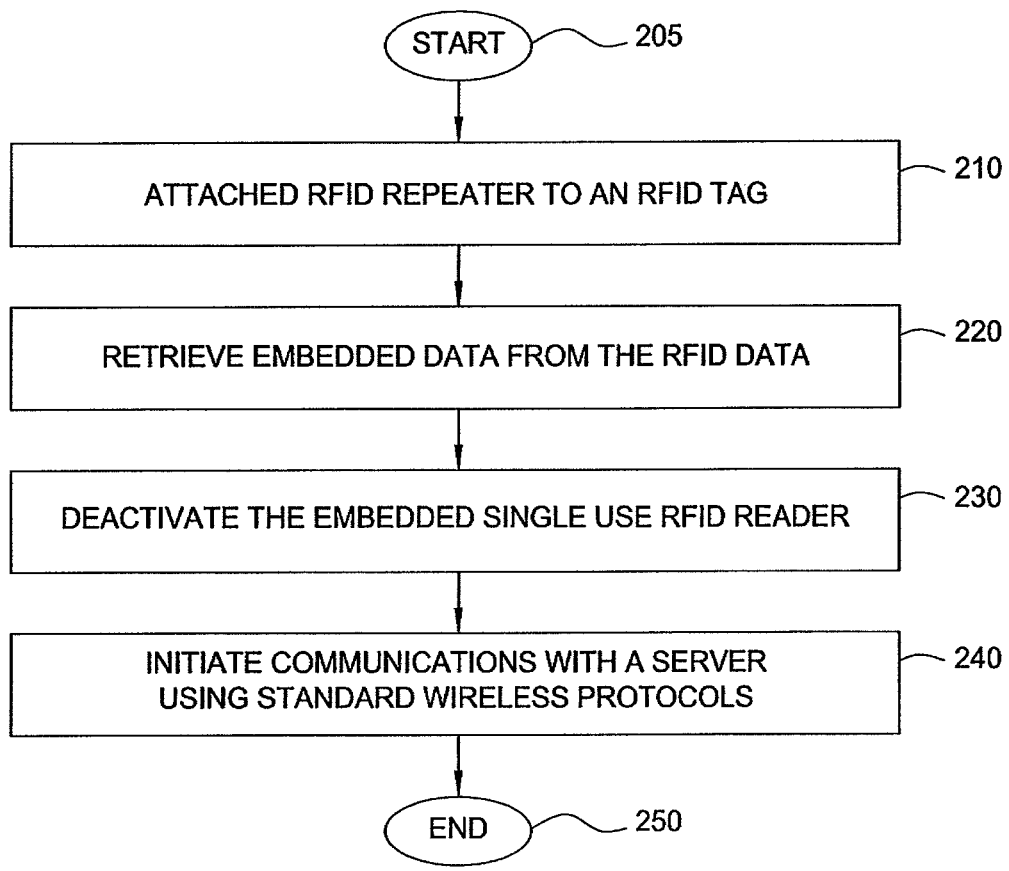
FIG. 2 illustrates a flowchart of a method for installing an RFID repeater in a wireless packet network of the present invention.

FIG. 2 illustrates a flowchart of a method for installing an RFID repeater in a wireless packet network of the present invention. Method 200 starts in step 205 and proceeds to step 210.

In step 210, the method attaches an RFID repeater to an RFID tag, which is to be tracked. The RFID tag can be a passive or an active tag. For example, the RFID repeater is attached to the RFID using an adhesive material such as Velcro or other appropriate adhesive medium.

In step 220, the method retrieves the data embedded in the RFID tag to the RFID repeater using an intermittently-activated low power RFID reader. If the RFID tag is a passive tag, the RFID repeater powers the RFID tag (e.g., via a communication signal) via the antennae arrangement of the two attached devices. The data read by the RFID repeater is stored in the RFID repeater for later use.

In step 230, the method deactivates the low power RFID reader embedded in the RFID repeater to conserve battery power in the RFID repeater.

In step 240, the method initiates communications of the retrieved RFID tag data between the RFID repeater and the location and data collection server using standard wireless packet access protocols via a wireless access point or base station. Once the communication has been initiated, the RFID repeater is tracked wirelessly via various wireless access points including, but not limited to, UWB, Zigbee, Wi-Fi, cellular etc. The method ends in step 250.

Figure 3:
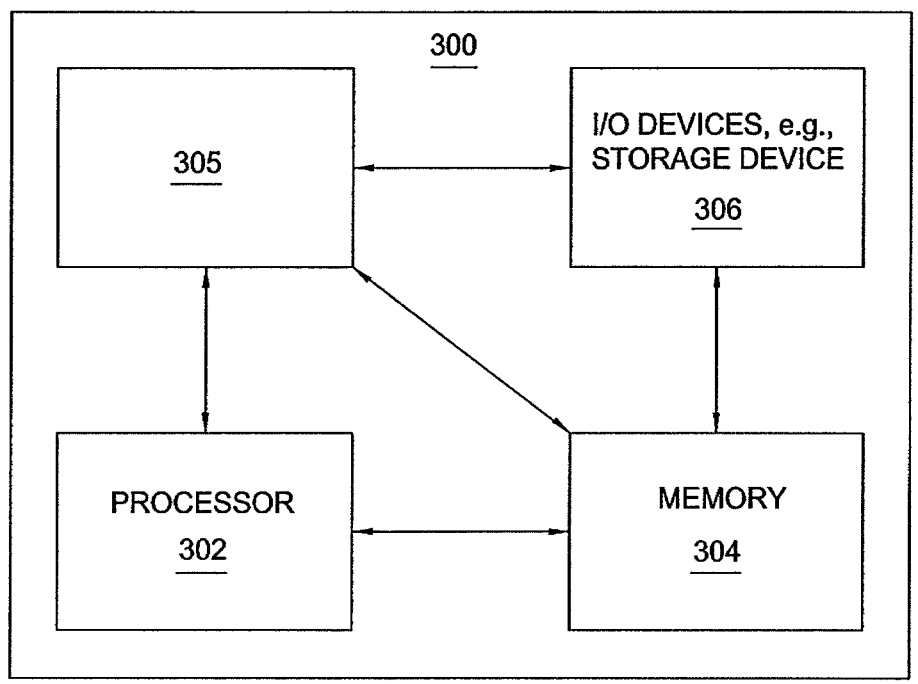
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing an RFID repeater, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for providing an RFID repeater can be loaded into memory 304 and executed by processor 302 to implement the functions as discussed above. As such, the present process 305 for providing an RFID repeater (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for communicating with a radio frequency identification tag, the method comprising:
    retrieving data from the radio frequency identification tag by a radio frequency identification repeater, wherein the radio frequency identification repeater is coupled to the radio frequency identification tag, wherein the retrieving comprises:
        reading the data by a radio frequency identification reader residing in the radio frequency identification repeater; and
        storing the data in a memory residing in the radio frequency identification repeater; and
    communicating the data that is retrieved from the radio frequency identification tag by the radio frequency identification repeater to a server via a wireless packet switched network.

2. The method of claim 1, wherein the wireless packet switched network employs at least one of: a wireless fidelity protocol, an ultra wideband protocol, a cellular protocol, or a Zigbee® protocol.

3. The method of claim 1, wherein the data that is retrieved is read via a pair of antennae between the radio frequency identification repeater and the radio frequency identification tag.

4. The method of claim 1, wherein the reading of the data from the radio frequency identification tag by the radio frequency identification reader is commanded remotely to refresh the data stored in the memory of the radio frequency identification repeater.

5. The method of claim 1, wherein the radio frequency identification tag comprises an active radio frequency identification tag or a passive radio frequency identification tag.

6. The method of claim 1, wherein the communicating comprises:
sending the data that is retrieved to the server via a wireless access point or a base station that provides a connectivity to the server.

7. The method of claim 6, wherein the connectivity comprises a wired local area network or a wireless local area network.

8. A communication system, comprising:
a radio frequency identification tag; and
a radio frequency identification repeater for retrieving data from the radio frequency identification tag, wherein the radio frequency identification repeater is coupled to the radio frequency identification tag, wherein the radio frequency identification repeater is for communicating the data that is retrieved from the radio frequency identification tag to a server via a wireless packet switched network, wherein the radio frequency identification repeater comprises a radio frequency identification reader for reading the data from the radio frequency identification tag, and wherein the data is stored in a memory residing in the radio frequency identification repeater.

9. The communication system of claim 8, wherein the wireless packet switched network employs at least one of: a wireless fidelity protocol, an ultra wideband protocol, a cellular protocol, or a Zigbee® protocol.

10. The communication system of claim 8, wherein the data that is retrieved is read via an antenna disposed on the radio frequency identification repeater and an antenna disposed on the radio frequency identification tag.

11. The communication system of claim 8, wherein the retrieving of the data from the radio frequency identification tag by the radio frequency identification reader is commanded remotely to refresh the data stored in the memory of the radio frequency identification repeater.

12. The communication system of claim 8, wherein the radio frequency identification tag comprises an active radio frequency identification tag or a passive radio frequency identification tag.

13. The communication system of claim 8, wherein the radio frequency identification repeater communicates the data that is retrieved by sending the data that is retrieved to the server via a wireless access point or a base station that provides a connectivity to the server.

14. The communication system of claim 13, wherein the connectivity comprises a wired local area network or a wireless local area network.

15. A tangible computer-readable medium storing instructions which, when executed by a processor of a radio frequency identification repeater, cause the processor to perform operations for communicating with a radio frequency identification tag, the operations comprising:
retrieving data from the radio frequency identification tag by the radio frequency identification repeater, wherein the radio frequency identification repeater is coupled to the radio frequency identification tag, wherein the retrieving comprises:
reading the data by a radio frequency identification reader residing in the radio frequency identification repeater; and
storing the data in a memory residing in the radio frequency identification repeater; and
communicating the data that is retrieved from the radio frequency identification tag by the radio frequency identification repeater to a server via a wireless packet switched network.

16. The tangible computer-readable medium of claim 15, wherein the wireless packet switched network employs at least one of: a wireless fidelity protocol, an ultra wideband protocol, a cellular protocol, or a Zigbee® protocol.

17. The tangible computer-readable medium of claim 15, wherein the data that is retrieved is read via a pair of antennae between the radio frequency identification repeater and the radio frequency identification tag.

18. The tangible computer-readable medium of claim 15, wherein the reading of the data from the radio frequency identification tag by the radio frequency identification reader is commanded remotely to refresh the data stored in the memory of the radio frequency identification repeater.

19. The tangible computer-readable medium of claim 15, wherein the radio frequency identification tag comprises an active radio frequency identification tag or a passive radio frequency identification tag.

20. The tangible computer-readable medium of claim 15, wherein the communicating comprises:
sending the data that is retrieved to the server via a wireless access point or a base station that provides a connectivity to the server.

* * * * *